(12) United States Patent
Hamilton et al.

(10) Patent No.: US 7,613,692 B2
(45) Date of Patent: Nov. 3, 2009

(54) PERSONA-BASED APPLICATION PERSONALIZATION

(75) Inventors: Keith Hamilton, Redmond, WA (US); Robert Zhu, Redmond, WA (US); Alexei Kourbatov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 11/459,780

(22) Filed: Jul. 25, 2006

(65) Prior Publication Data

US 2008/0027924 A1 Jan. 31, 2008

(51) Int. Cl.
*G06F 7/00* (2006.01)
(52) U.S. Cl. .......................................... 707/3
(58) Field of Classification Search ................ 707/3
See application file for complete search history.

(56) References Cited

U.S. PATENT DOCUMENTS

| | | |
|---|---|---|
| 6,460,036 B1 | 10/2002 | Herz |
| 6,505,202 B1 | 1/2003 | Mosquera et al. |
| 6,847,963 B1 | 1/2005 | Paclat |
| 6,959,319 B1 | 10/2005 | Huang et al. |
| 6,990,590 B2 | 1/2006 | Hanson et al. |
| 2001/0014868 A1* | 8/2001 | Herz et al. .............. 707/14 |
| 2004/0128301 A1 | 7/2004 | Thint et al. |
| 2004/0204979 A1 | 10/2004 | Eisenberg et al. |
| 2004/0254911 A1* | 12/2004 | Grasso et al. ............ 707/1 |
| 2005/0022114 A1* | 1/2005 | Shanahan et al. ........ 715/513 |
| 2005/0102292 A1* | 5/2005 | Tamayo et al. ........... 707/10 |
| 2005/0108329 A1 | 5/2005 | Weaver et al. |
| 2005/0169453 A1 | 8/2005 | Knott et al. |
| 2005/0187802 A1* | 8/2005 | Koeppel ............... 705/4 |
| 2005/0262151 A1 | 11/2005 | Plastina et al. |
| 2005/0273717 A1 | 12/2005 | Breeden et al. |
| 2006/0036951 A1 | 2/2006 | Marion et al. |

FOREIGN PATENT DOCUMENTS

WO WO9939281 8/1999

OTHER PUBLICATIONS

Price, B., et al.; Automatic construction of personalized customer interfaces; 2006; 7 pages.
Kobsa, A., et al.; Privacy through pseudonymity in user-adaptive systems; May 2003; 35 pages.
Sugiyama, K., et al.; Adaptive Web Search Based on User Profile Constructed without Any Effort from Users; May 2004; 10 pages.
Bharat, K., et al.; Personalized, Interactive News on the Web; May 5, 1997; 22 pages.

* cited by examiner

*Primary Examiner*—Charles Rones
*Assistant Examiner*—Fazlul Quader
(74) *Attorney, Agent, or Firm*—Workman Nydegger

(57) ABSTRACT

Systems and methods that facilitate persona-based application personalization are disclosed. A persona is a conglomeration of a group of archetypal users that represent the personalization needs of many users and is based on observed behavior and patterns associated with the group of users. Users can be grouped into personas, and the personas can be analyzed to facilitate application personalization at a person level. Individual users can then be mapped to personas based on correlations of their respective individual behaviors and/or usage patters to the usage patterns of the persona as a whole.

19 Claims, 10 Drawing Sheets

PERSONA-BASED APPLICATION PERSONALIZATION

BACKGROUND

Computers and computer-based devices have become a necessary tool for many applications throughout the world. Typewriters and slide rules have become obsolete in favor of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

Conventional applications have been designed with static user interfaces and behavior, and cannot adapt beyond their design. Attempts at personalization have been limited to maintaining a list of recently executed applications for a user in the event that recent execution correlates to frequent execution, which is not necessarily the case. With regard to applications such as web applications, operating system applications, etc., attempts have been made to add a personal touch for an end user, but such attempts are made at a very granular level, resulting in rapid obsolescence. For instance, as user preferences change, previous personalization of an application quickly can become outmoded. Thus, there exists a need in the art for systems and/or methodologies that overcome the above-mentioned deficiencies.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein are one or more techniques whereby applications can be personalized for a user or a group of users based on personas associated with the users. According to various aspects, personas can be generated and/or defined as a function of groups of users having similar usage histories. Candidate applications for personalization can be, for example, web-based applications, rich-client applications, etc. For instance, a first group of users that predominantly visits a portion of a website related to technical support can be analyzed and grouped to define a first persona, a second group of users that predominantly visits a portion of a website related to end-user information can be analyzed and grouped to define a second persona, and so on. A web-based application providing the content can be personalized for each persona, and users can be mapped to the personas based on their respective usage histories. Once a user has been mapped to a persona, the user can access the personalized version of the application. Personas and personalization thereof can be continuously updated to enhance user experience.

Accordingly, the invention disclosed and claimed herein, in one aspect thereof, comprises a computer-implemented system that facilitates performing application personalization based on persona. The system can analyze user history (e.g., search terms entered, links clicked, keywords associated with content viewed, . . . ) to correlate the user to one or more personas. Once mapped to a persona, the user can be presented with a version of the application that is personalized to the persona. Historical usage associated with all users mapped to the persona can be utilized to periodically and/or continuously update the application version for the persona.

According to another aspect, a method of personalizing an application based on personas can comprise evaluating usage history for a user of an application and inferring a persona to which the user can be mapped. The inference can be a function of correlation between the user's history and usage history associated with the persona, which is based on usage history associated with all users mapped to the persona. The method can further comprise employing a URL-based inference rule, a search term-based inference rule, a keyword-based inference rule, etc. Further more, personas can be updated as usage history changes over time in order to provide up-to-the-minute personalization and content relevance for users mapped to the persona.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
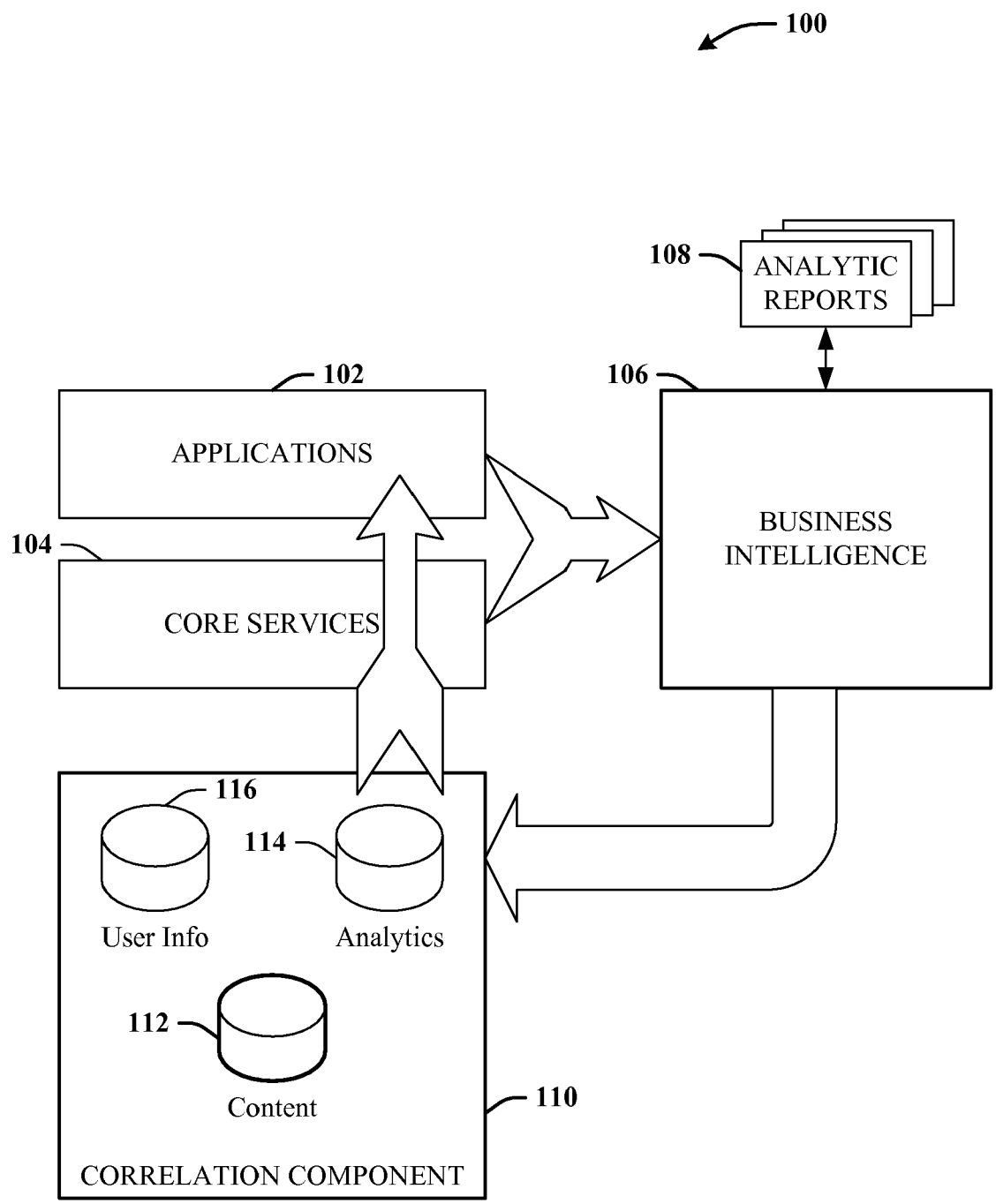
FIG. 1 illustrates a computer-implemented system that facilitates personalizing an application based on user persona and usage history, in accordance with one or more aspects.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

According to various aspects described herein, systems and methodologies are presented that facilitate personalizing an application for a user based on one or more personas to which the user is mapped. The subject innovation relates to building "smart" applications that can be personalized to a user through continuous improvement to provide the user with just-in-time content and functionality. Personalization can be driven not only by a specific user's usage pattern and/or configuration information, but also by one or more personas of the individual in a given context. In addition, effectiveness information related to performance of the smart application can be utilized by developers to facilitate providing further structural enhancements. In this manner, a software application can be provided that continuously improves itself to provide a user with a better experience over time. For example, the software can adapt to the user to make it progressively easier for the user to perform specific tasks and/or to find content which is most relevant to the user.

The smart applications can be web-based applications, rich client applications, or any other suitable type of application. For instance, various aspects facilitate transforming, through personalization, web-based applications into adaptive web sites and/or rich client applications into smart applications. In order for software to adapt, various intelligence schemes can be employed. For instance, metrics related to state changes can be identified/captured be captured, and analyzed to identify meaningful patterns. The results of the analysis can be consumed by the application and its environment to close a feedback loop, and the application can adjust its behavior accordingly.

According to related aspects, metrics analysis can be utilized to better understand the effectiveness of application features in order to provide direction with regard to sensible enhancements to the application (e.g., enhancing the software lifecycle management process and providing objective data to drive future application enhancements). Today, most application development teams use very ad hoc means to determine which feature enhancements should be included in an application. However, if user actions are collected and analyzed, be it a web site or a smart application, then a much more objective data with a much larger population size can be achieved. By collecting metrics related to application usage, the effectiveness of specific features of the application can be accurately measured. Metrics can comprise, for example, ease with which a user locates a desired feature, a number of times the user abandoned the feature after initiating, a click path associated with locating and initiating the feature, most frequently used features, common ordering of feature utilization, etc. In addition, a scorecard for an application can be predefined to measure its effectiveness. The metric data collected can provide an objective view that provides insight into an application's success.

According to still other aspects, an application can be personalized based upon a persona of the individual, such as a role the individual fills (e.g., application developer, application installer, application user, . . . ). In this manner, a given user can have an experience personalized by the collective usage of all users in that persona.

Referring initially to the drawings, FIG. 1 illustrates a computer-implemented system 100 that facilitates personalizing an application based on user persona and usage history, in accordance with one or more aspects. System 100 can facilitate building personalized applications by analyzing, for instance, user information, content information, and application functionality information. Information about a user can be collected anonymously to mitigate user concern, and can comprise content and functionality that a user clicks on, initiates, employs, etc. For instance, with web solutions, every click a user makes on the web pages can be identified and catalogued. From such information, determinations can be made regarding content the user was interested in, common usage scenario flows, what actions a user may have started but cancelled prior to completion, etc.

Additionally, inferences can be made regarding into which persona(s) the user may be mapped. Moreover, content information can be utilized to map a user to a persona. For example, in addition to employing a common taxonomy, which can be used to correlate web pages to each other, tagging web pages with metadata to add a more granular means of correlating content together can facilitate improving web page correlation. Whereas a key word search may find a piece of content, ad hoc key words are not necessarily ideal to associate similar relevant content. An application can thus present suggestions to a user for similar relevant content by knowing the specific user, knowing the persona of the user, and knowing what other content is related via taxonomy and metadata.

The application can be designed to be adaptable by using the results of the analysis process. The application can modify all aspects of itself. For instance, a word-processing application can promote items in pull-out menus based upon user activity, so that a user can more efficiently find and execute an item. Once a pattern is found, the application could adapt to make it easier for the user to transition between the tasks.

The system 100 comprises one or more applications 102 and core services 104 that can be provided to and/or utilized by a user. A business intelligence (BI) component 106 can analyze functionality and content information associated with the application, which has been tagged using a combination of taxonomy and metadata tags, and which comprises information related to captured actions of the user. A plurality of analytic reports 108 related to user action can be generated and/or utilized by the BI component 106, and can comprise information related to a user's usage history, which may comprise, for instance, identities of web sites visited by the user, content associated there with, online purchases, durations of visits to particular websites, etc., without being limited thereto. The BI component 106 can provide analyzed information to a correlation component 110, which comprises a content engine 112, an analytics engine 114, and a user information engine 116, described in greater detail below. For example, the content engine 112 can facilitate categorizing a set of links according to keywords associated with the links. The correlation component 110 can then provide update information to the one or more applications 102 to update and/or adapt the applications in order to personalize the application(s) according to a persona to which a user of the application(s) is mapped. For instance, the correlation component 110 can update the application 102 to recommend content to a user based on content topics and page hit counts associated with the correlated links and keywords.

The correlation component 110 can be viewed as an analysis engine that infers one or more personas to which users can be mapped to facilitate personalization. A persona is an archetypal user that represents a certain group of users based on observed behavior patterns and goals. When inferring/defining personas, the correlation component 110 can identify groupings of usage patterns. Since usage patterns can vary over time, the inferences can be dynamic and not necessarily static. An individual can be mapped to one or more personas based upon their usage patterns relative to the persona usage patterns.

As mentioned above, applications (e.g., web solutions, rich client, etc.) can be instrumented using a combination of taxonomy and metadata to tag the functionality and content of the application. As the user uses an application, all actions can be captured and sent to the BI component 106 for analysis. The analysis process can infer the user's persona and identify usage patterns of the application, which information can be used by the application(s) 102 to adapt to the user and to the user's persona. For instance, in the case of a web solution, the application 102 can emphasize (e.g., give priority to) content deemed most relative to the particular user and that type of user (e.g., the user's persona). The application 102 can also show quick links to other content that may be relevant to the user by doing path analysis for paths it knows are likely end destinations. The application 102 can also have a priori knowledge that this user commonly transitions to other areas of content and can provide quick links to save the user multiple clicks to get the other areas of content.

The analytics engine 114 can perform analysis to identify patterns of user activity relative to the content, which in turn can define a persona. The resulting personas can be identified as human-understandable personas, such as "system programmer," "SQL administrator," "game user," "journalist," etc. According to some aspects, the analysis can involve identifying a statistical pattern on user navigation history of all or a subset of all users. Where there is high correlation of the same navigation by multiple users, patterns and personas can be defined. Based upon the statistical patterns, new users can be correlated to a given persona and thereby be assisted by information related to how that persona commonly navigated through content or application functionality. User behavior can comprise navigation (clicking) history and pattern, through content and application functionality, actionable clicks (downloading/tasks), inputs (typing search terms), etc. Through data mining, clustering, and/or associative algorithms, we can get the navigation paths for every user and their navigation pattern.

For example: a user who visits a developer network website with the link: devnet.ABC.com, the history and pattern of web page navigation can be gleaned, such as how many unique users visited devnet.ABC.com or how many users go from devnet.ABC.com to devnet.ABC.com/hotestlink1. Therefore, a recommendation list resulting from previous persona usage can be, for example:

devnet.ABC.com -> devnet.ABC.com/hottestlink1 (top 1 recommending)
devnet.ABC.com -> devnet.ABC.com/hottestlink2 (top 2 recommending)
devnet.ABC.com -> devnet.ABC.com/hottestlink3 (top 3 recommending)

If the user continues to type "xml" in the search box, the recommendation can be, for example:

devnet.ABC.com with xml search ->
devnet.ABC.com/xmlhottestlink1 (top 1 recommending)
devnet.ABC.com with xml search ->
devnet.ABC.com/xmlhottestlink2 (top 2 recommending)
devnet.ABC.com with xml search ->
devnet.ABC.com/xmlhottestlink3 (top 3 recommending)

If the user were to eventually download sqlxml.dll from a subsequent web page, the download thank.aspx query string can provide the familyID of the download. By analyzing this information, since content is correlated to itself, it can be determined that sqlxml.dll belongs to SQL product family. The recommendation list could then be:

devnet.ABC.com/xmlSQLhottestlink1 (top 1 recommending)
devnet.ABC.com/xmlSQLhottestlink2 (top 2 recommending)
devnet.ABC.com/xmlSQLhottestlink3 (top 3 recommending)

According to the above, the recommending links are based upon what persona the user is mapped to, from the current context of where the user navigated from, and from what content they have viewed. The recommendations are based on actions taken by the persona in the same scenario. The analysis can also be done based upon sessions, which are often defined as 30-minute windows but may be longer or shorter according to design constraints and/or developer preferences. For example:

| No. of Users | URI | Hour | Min | MSID | IISTime |
| --- | --- | --- | --- | --- | --- |
| 1 million | URIA | 15 | 6 | EFD... | 15:06 |
| 1 million (same) | URIB | 15 | 10 | EFD... | 15:10 |
| 0.5 million | URIC | 15 | 18 | EFD... | 15:18 |
| 0.1 million | URID | 15 | 20 | EFD... | 18:20 |
| 0.02 million | URIE | 18 | 20 | EFD... | 18:10 | can result in a recommendation with the sequential order:

| From | ToRecommended |
| --- | --- |
| URIA | URIB |
| URIA | URIC |
| URIA | URID |
| URIB | URIC |
| URIB | URID |
| URIC | URID |

The foregoing can create a composite recommendation of:

| | |
|---|---|
| URIA | URIB |
| URIA | URIC |
| URIA | URID |
| URIB | URIA |
| URIB | URIC |
| URIB | URID |
| URIC | URIA |
| URIC | URIB |
| URIC | URID |
| URID | URIA |
| URID | URIB |
| URID | URIC |

These actions can also take into consideration other qualities of the content, such as content rating, survey results, and other actionable events such as a user clicking on a link in an email, etc.

The centralized user information engine can analyze information related to a users' navigation history. From a user's navigation history, inferences can be made regarding personas to which the user should be mapped. Such information can be stored and/or utilized by other systems when they interact with the user. For example, a given persona can represent SQL administrators. According to various aspects, a marketing system can desire to send promotional mail to such users, an advertising system can use the persona information to better target a user with relevant content, etc.

According to other examples, a first persona can be defined for users whose historical usage indicates a high interest in music, which can be quantified via analysis of a number of times the user visited a site related to music, a total amount of time a user spent on such sites, etc. Other personas can be defined for users interested in sports, movies, academic subjects, literature, art, current events, politics, or any other suitable topic or combination thereof. User's whose historical usage indicates a level of interest above a predetermined threshold level can then be mapped to the particular personas that correlate to the users' interests.

According to other aspects, a threshold value can be predefined, above which a user can be mapped to a persona. For instance, the threshold value can be a minimum number of site visits per time period (e.g., 5 visits per week, 10 visits per month, 1 visit per day, etc.). According to a related example, the threshold value may be a percentage of total time spent on a site or application during a predefined time period. For instance, a user who spends a minimum percentage (e.g., 5%, 7%, 10%, etc.) of online time on web pages pertaining to a given topic (e.g., politics, music, sports, etc.) can be mapped to persona for the given topic (e.g. a politics persona, a sports persona, a music persona, etc.).

According to still other aspects, an application may be offline (e.g. an operating system application, a word-processing application, a spreadsheet application, etc.), and can be personalized to a specific user based on historical usage, etc. For instance, a user may initiate a particular word processing application several times a week, thus making the user a candidate for a "word-processing" persona mapping. The user may additionally favor certain features over others, and such usage information may be analyzed by the various components of system 100 to facilitate automatically personalizing a toolbar associated with the word-processing application by the personalization component. To further this example, a user who enters mathematical symbols into word-processing documents with a high frequency but who rarely formats text using bold or italics can have the word-processing application automatically personalized to include a mathematical symbol insertion icon in the toolbar while icons for bold and italic formatting can be removed from the toolbar to conserve space thereon. In this sense, the user can be mapped to a sub-persona within the word-processing persons (e.g., a "mathematical symbol persons" or the like). Any suitable number of sub-personas can be defined within a given persona.

For instance, a user who frequently evokes a spell-check function in a word processor can be mapped to a predefined "copy-editor" sub-persona that personalizes a toolbar to include a spell-check icon, as well as any other related or useful icons (e.g., dictionary icon, thesaurus icon, grammar-check icon, etc. In the case of a web-based application persona, such as the "politics" persona described with regard to foregoing examples, a user may be further mapped to sub-personas related to, for instance, politics in specific countries, regions of the world, states or provinces, particular branches of government, etc., without being limited thereto. According to another example, a music persona can have a plurality of sub-personas related to music genres, particular artists, eras, etc. It will be appreciated that any desired level of granularity can be achieved when personas and/or sub-personas thereof in order to personalize applications in accordance with various aspects presented herein.

Figure 2:
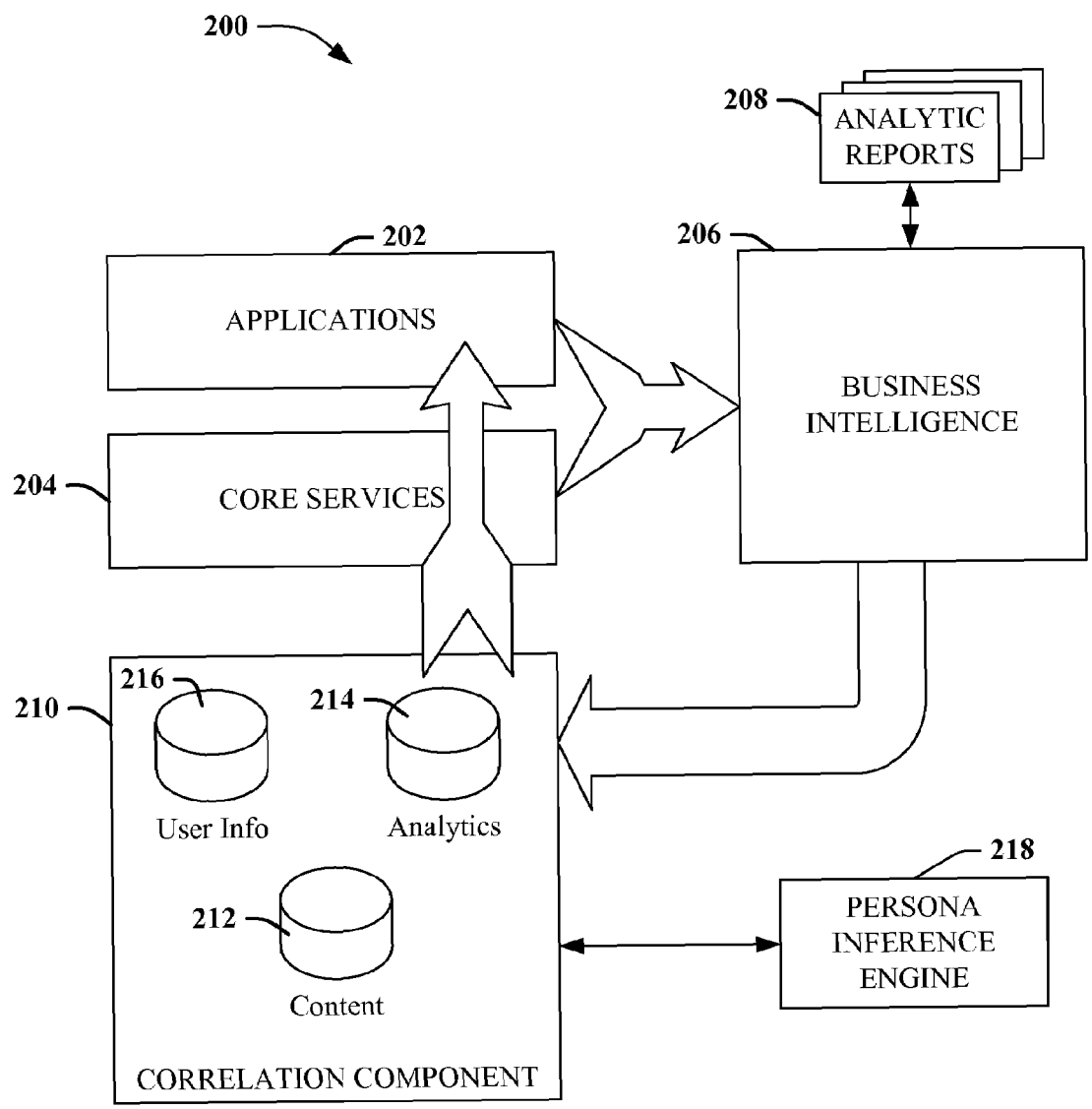
FIG. 2 is an illustration of a computer-implemented system that facilitates personalizing applications based on personas, in accordance with various aspects.

FIG. 2 is an illustration of a computer-implemented system 200 that facilitates personalizing applications based on personas, in accordance with various aspects. The system 200 comprises one or more applications 202 and core service 204 that can be provided to a user, which can be analyzed by a business intelligence component 206 that can analyze functionality and content information associated with the application(s) 202, where the information has been tagged using a combination of taxonomy and metadata tags, and comprises information related to captured actions of the user. A plurality of analytic reports 208 related to user action can be generated and/or utilized by the BI component 206, and can comprise information related to a user's usage history, which may comprise, for instance, identities of web sites visited by the user, content associated there with, online purchases, durations of visits to particular websites, etc., without being limited thereto. The BI component 206 can comprise an infrastructure that collects application usage metrics, stores user information, stores content information, and/or performs the deep analysis between these pieces of information. The foregoing can be achieved via class libraries and tooling.

The BI component 206 can provide analyzed information to a correlation component 210, which comprises a content engine 212, an analytics engine 214, and a user information engine 216, similar to those described above with regard to FIG. 1. The correlation component 210 can then provide update information to the one or more applications 202 to update and/or adapt the applications in order to personalize the application(s) according to a persona to which a user of the application(s) is mapped.

The system 200 can additionally comprise a client-side persona inference engine 218, so that in addition to or instead of storing the navigation histories of millions of users in a centralized location, many applications can benefit from inference of the user persona directly within the end user's client software (such as an Internet browser). In this architecture, a client computer downloads the latest persona inference rules from the server(s), infers the current user persona(s) on the client side based on the user's most recent activity, and reports the inferred persona back to the server. The persona inference can be based on several types of information that are readily available to each client, such as URLs that have been most recently visited by the particular client, most-recently viewed keywords (e.g., page titles, headings, META keywords, etc.), most-recent search queries of the particular client, etc.

The following are examples of simple rules that can be used by individual clients to infer whether the current user persona is, according to a three-persona example, a Developer, IT Professional, or Gamer. For instance, a URL-based rule can stipulate that if a user recently visited URL(s) containing "technet" as a substring, that user is likely an IT Professional Persona; if a user recently visited URL(s) containing a development network website "devnet" or "netframework" as a substring, that user is likely a Developer Persona; and if a user recently visited URL(s) containing "gaming" as a substring, that user is likely to be a Gamer Persona. A keyword-based rule can stipulate that if a website user recently viewed page(s) prominently featuring the words "gaming" or "empires" or "arcade" or "game", that user is likely to be a Gamer Persona. According to a further example, a search-based rule can stipulate that if a user recently searched for "SQL Server" and "backup", that user is likely to be an IT Professional Persona and/or Database Administrator Persona. It will be appreciated that such inference rules can produce a "multi-persona" image of a single user; for example, a user can turn out to be a Developer (score 0.75) and an IT Professional (score 0.25). Scores can be computed from multiple inference rules like the above, using a weighted approach.

Inferences related to mapping a user to one or more personas can be a function of weights assigned to particular metrics. For instance, content that is clearly relevant to a developer persona can be given a weight of 1 for that persona, while content that is deemed relevant mainly to a developer but also somewhat relevant to a technician persona can be weighted for both personas. For example, a weight associated with a given piece of content can be 0.75 for a developer persona and 0.25 for a technician persona. Additionally or alternatively, the respective weights can be 1.0 and 0.5 (e.g., the weight distribution between personas need not equal 1). Similarly, search terms can be weighted (e.g., when employing a search term-based rule) as can URLs and/or titles thereof (e.g., when utilizing a URL-based rule), etc.

The client-side persona inference engine 218 can report the current user persona to a Web server tier of the application 202 by utilizing a session cookie. Depending on the privacy preferences of the current user, the information about the inferred persona may or may not be stored on the hard drive of the client machine for personalization purposes in one or more usage sessions that follow. A backend tier(s) of the application 202 can then store the latest persona(s) associated with the current user ID and/or just react to the current user's visit in a customized way and/or compute statistics such as, for example: "Today's visitors: 43% developers, 31% IT Pros, 9% Gamers," etc.

According to another aspect, a distributed persona inference engine (not shown) can be utilized by employing a unified technique that combines the best of both a centralized user information engine and analytics engine, and a client-side persona inference engine(s). On the one hand, the use of a client-side persona inference engine allows each client to infer the current user persona(s) in real time, based on the most recent actions of that particular user, which significantly reduces the number of round-trips from client computers to the backend centralized user information engine, and also reduces the load on the backend computers, sparing them the repetitious task of matching a particular user's GUID to the pre-computed persona of that user. Conversely, an advantage of the centralized information/analytics engine is that the inference rules (e.g., keywords-to-persona, URL-to-persona, search-to-persona etc.) no longer need to be static, but rather can be dynamic. The centralized information engine can refine the inference rules on a regular basis (for example, once a week, twice a month, or according to some other suitable schedule) based on the actual persona clustering within the last analyzed period. The Web server tier of the application 202 can publish the refined inference rules, so that each client can download them during its next visit and use the refined rules within its client-side persona inference engine. Thus, a distributed persona inference engine facilitates providing real-time personalization based on the latest user actions, reduced load on back-end systems running centralized information/analytics engine, and closed feedback loop to refine persona inference rules.

Figure 3:
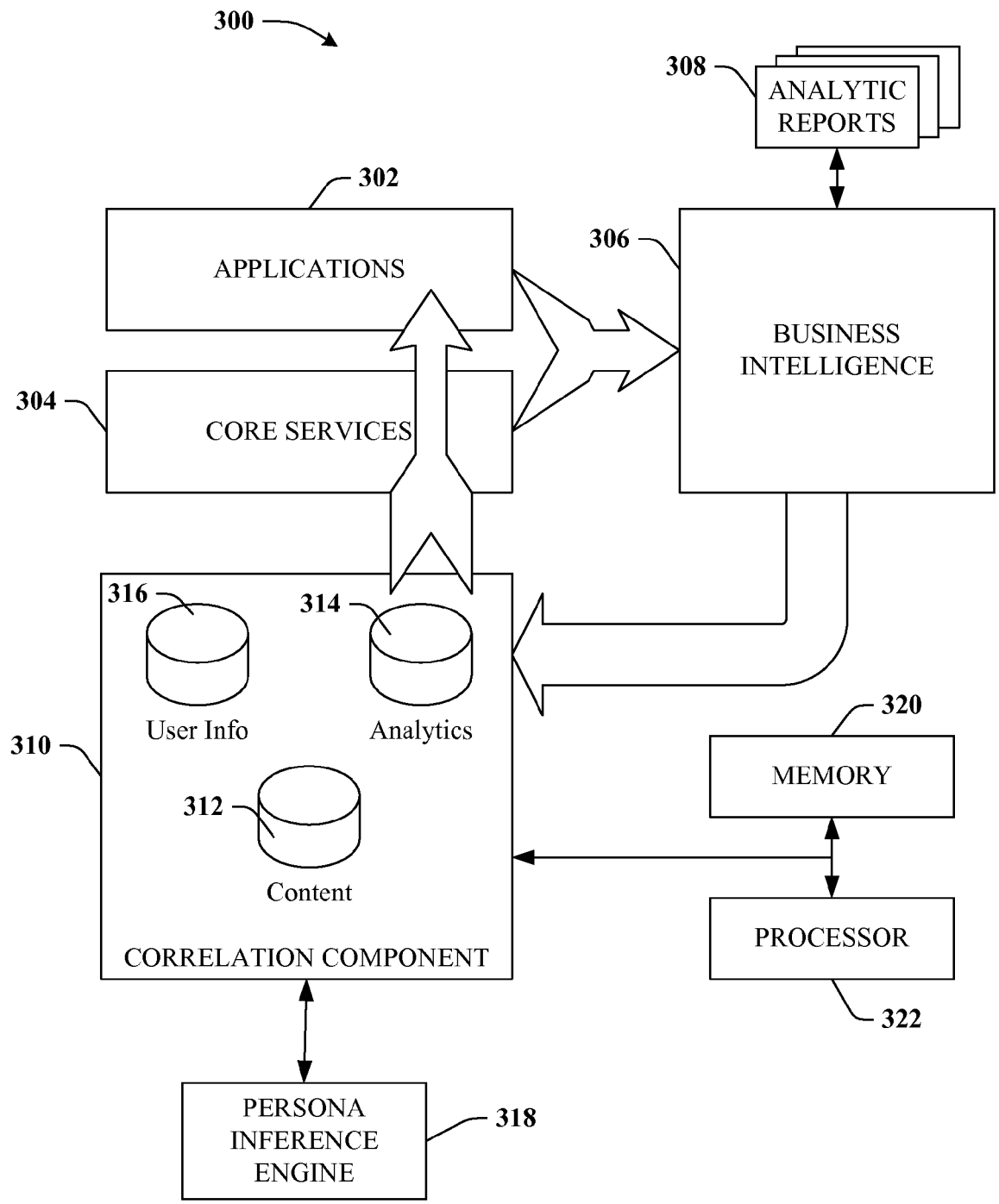
FIG. 3 illustrates a computer-implemented system that facilitates performing persona-based personalization of applications, in accordance with one or more aspects.

FIG. 3 illustrates a computer-implemented system 300 that facilitates performing persona-based personalization of applications, in accordance with one or more aspects. The system 300 comprises one or more applications 302 and core service(s) 304 that can be provided to a user, and which can be analyzed by a business intelligence component 306 that can analyze functionality and content information associated with the application(s) 302, where the information has been tagged using a combination of taxonomy and metadata tags, and comprises information related to captured actions of the user. A plurality of analytic reports 308 related to user action can be generated and/or utilized by the BI component 306, and can comprise information related to a user's usage history, which may comprise, for instance, identities of web sites visited by the user, content associated therewith, online purchases, durations of visits to particular websites, etc., without being limited thereto. The BI component 306 can comprise an infrastructure that collects application usage metrics, stores user information, stores content information, and/or performs the deep analysis between these pieces of information. The foregoing can be achieved via class libraries and tooling.

The BI component 306 can provide analyzed information to a correlation component 310, which comprises a content engine 312, an analytics engine 314, and a user information engine 316, similar to those described above with regard to FIG. 1. The correlation component 310 can then provide update information to the one or more applications 302 to update and/or adapt the applications in order to personalize the application(s) according to a persona to which a user of the application(s) is mapped. The system 300 can additionally comprise a persona inference engine 318 as detailed above with regard to FIG. 2.

The system 300 can further comprise each of a memory 320 and a processor 322 to facilitate performing the various functions described above. The processor 322 can be a processor dedicated to analyzing data in conjunction with one or more of the components of the system 300, a processor that controls one or more components of the system 300, and/or a processor that both analyzes data in conjunction with one or more of the components of the system 300 and controls one or more components of system 300.

It will be appreciated that the memory 320 can be a data store that can store various data related to the system 300. The data store can provide storage for user history, persona definitions, user-persona maps and/or updates, personalization schemes, protocols related thereto, etc. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data stores of the subject systems and methods are intended to comprise, without being limited to, these and any other suitable types of memory. In addition, it is to be appreciated that such data stores can be a server, a database, a hard drive, and the like.

Additionally, it is to be understood that the business intelligence component 306 and/or the persona inference engine 318 can facilitate reasoning about or inferring states of the system 300, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines, . . . ) can be employed in connection with performing automatic and/or inferred action in connection with the claimed subject matter.

A classifier is a function that maps an input attribute vector, $x=(x_1, x_2, x_3, x_4, \ldots, x_n)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Such classification schemes can be utilized by the subject systems and/or methods to facilitate inferring states and/or actions related to personalized content organization, selection, download, etc.

Figure 4:
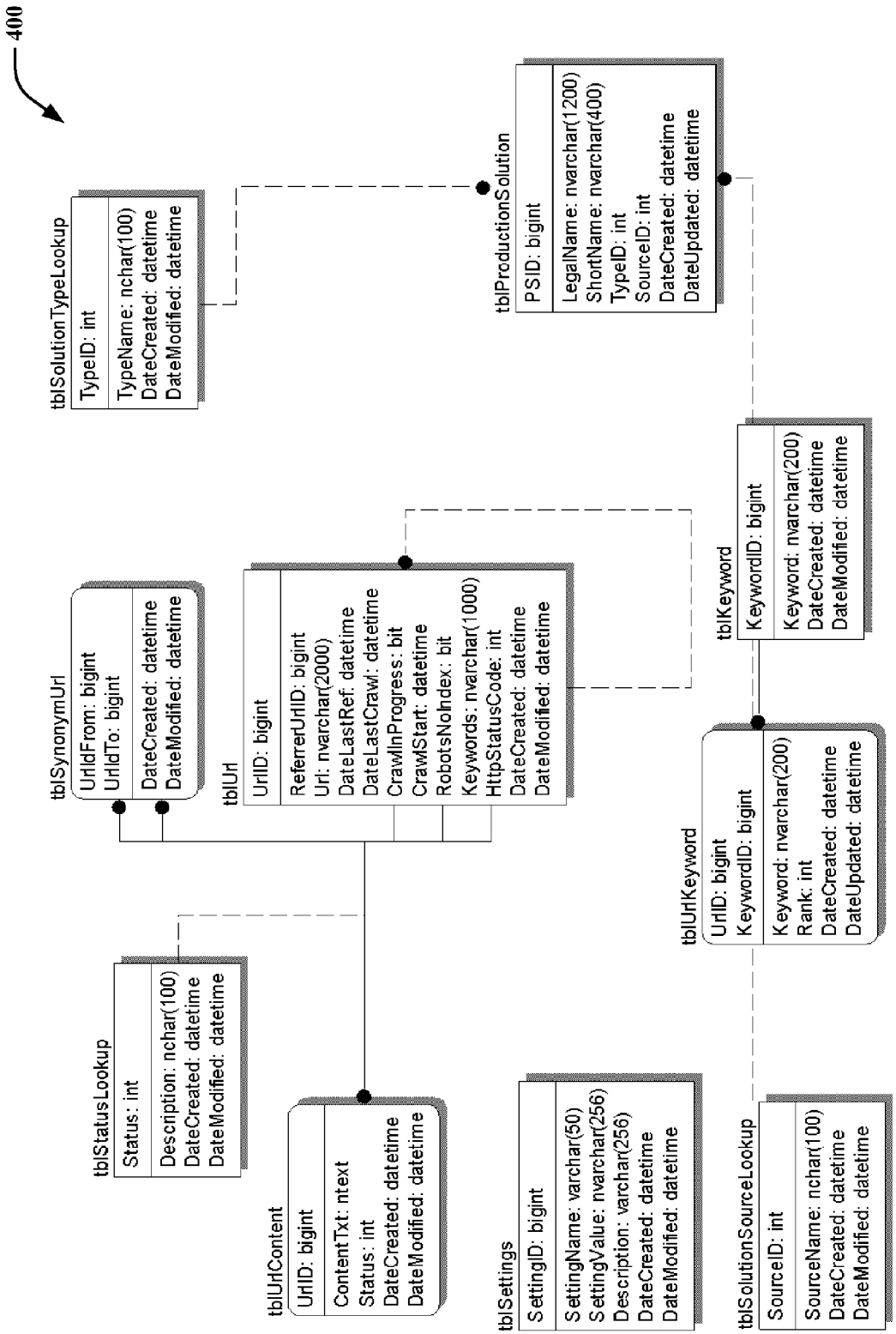
FIG. 4 illustrates an example of a schema diagram that defines data captured by a content engine, in accordance with one or more aspects.

FIG. 4 illustrates an example of a schema diagram 400 that defines data captured by a content engine, in accordance with one or more aspects. The content engine can be, for example, a content engine such as is described above with regard to the preceding figures. Such a content engine is designed to categorize links according to their associated content's keywords. Related contents can then be recommended based on content topics and page hit counts. For example, in the event that a new user browses a homepage "A" in the U.S. locale and "A" page is talking about ABC and ABC Corporation, "A" page's content topic is ABC and ABC Corporation, which are rated as the number 1 and 2 most important topics. An example of a Class Library API can be expressed as:

```
XmlDomObject Recommend (locale, incomingURI, out
recommended_num_links)
Or
XmlDomObject Recommend (locale, content_topic, out
recommended_num_links)
```

In the above scenario, a Recommend protocol can provide a list of links of U.S. locales for the content topic of ABC Corporation. Refresh periods for the content topics can be captured in a data warehouse by periodically crawling the links and updated times, as well as updating the content topics in the background. According to related aspects, a content categorization crawler can be utilized to provide the foregoing functionality.

FIGS. 5-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Figure 5:
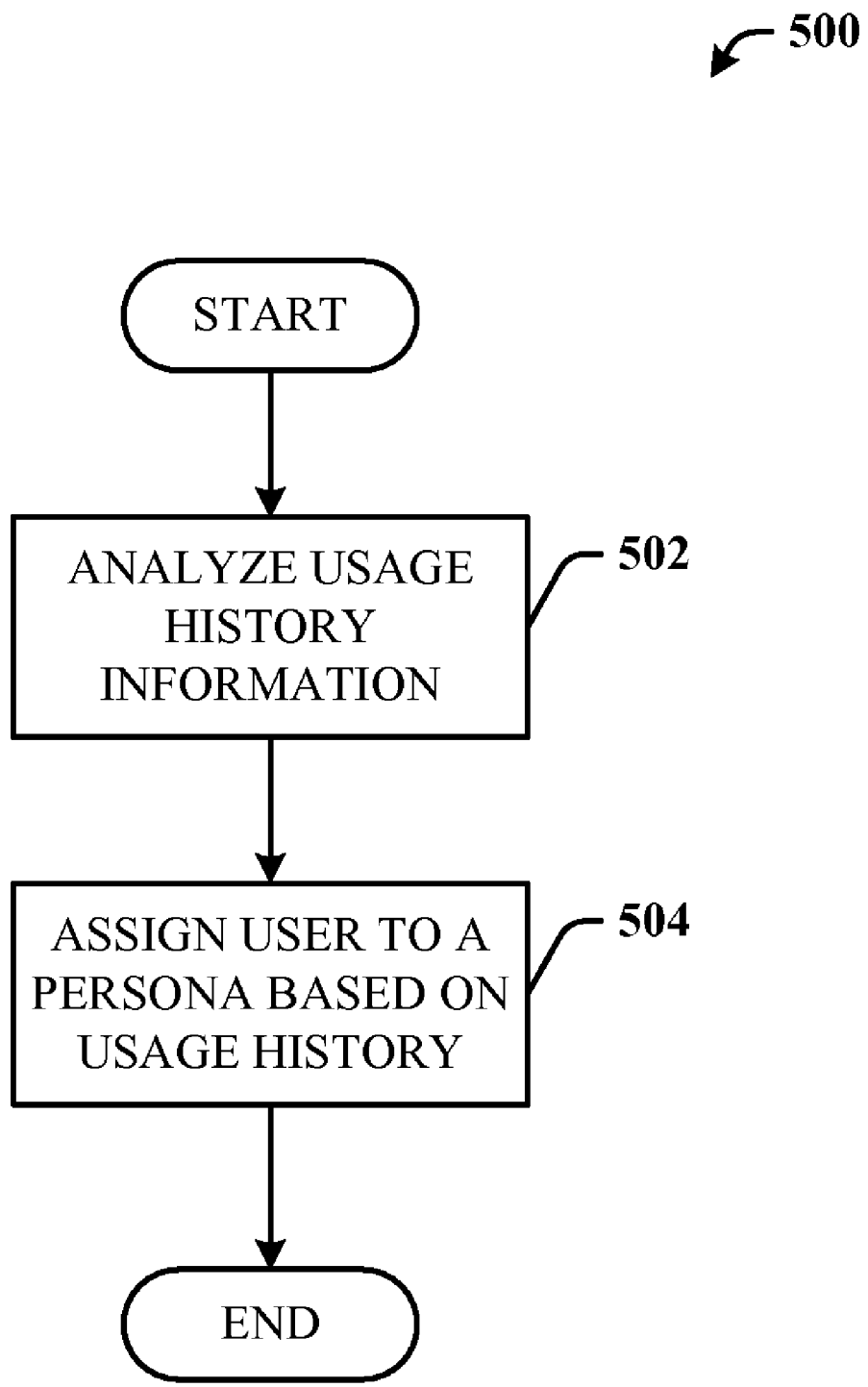
FIG. 5 illustrates a methodology for personalizing an application for a user based on a persona to which the user is mapped, in accordance with various aspects.

FIG. 5 illustrates a methodology for personalizing an application for a user based on a persona to which the user is mapped, in accordance with various aspects. At 502, usage history for the user can be analyzed. Usage history can comprise, for instance, identities of web sites visited by the user, content associated there with, online purchases, durations of visits to particular websites, etc., without being limited thereto. Usage history can additionally comprise, for example, offline application usage (e.g., word-processing applications, spreadsheet applications, gaming applications, . . . ) and actions associated therewith. The user can be assigned to a persona (or a plurality of personas) based on usage history. For instance, for a user who frequently uses a word-processing application to generate documents can be assigned to a persona related to word-processing. Further inferences can be made to evaluate actions taken by all or a subset of users that define the word-processing persona to personalize a toolbar in the word-processing application for the specific user. For example, if a majority of users in the word-processing persona employ text formatting tools (e.g., bold, italics, underline, subscript/superscript, . . . ) then the word-processing persona can be personalized to include such formatting tools on a toolbar so that a user assigned to the persona need only click once to activate the tools.

Figure 6:
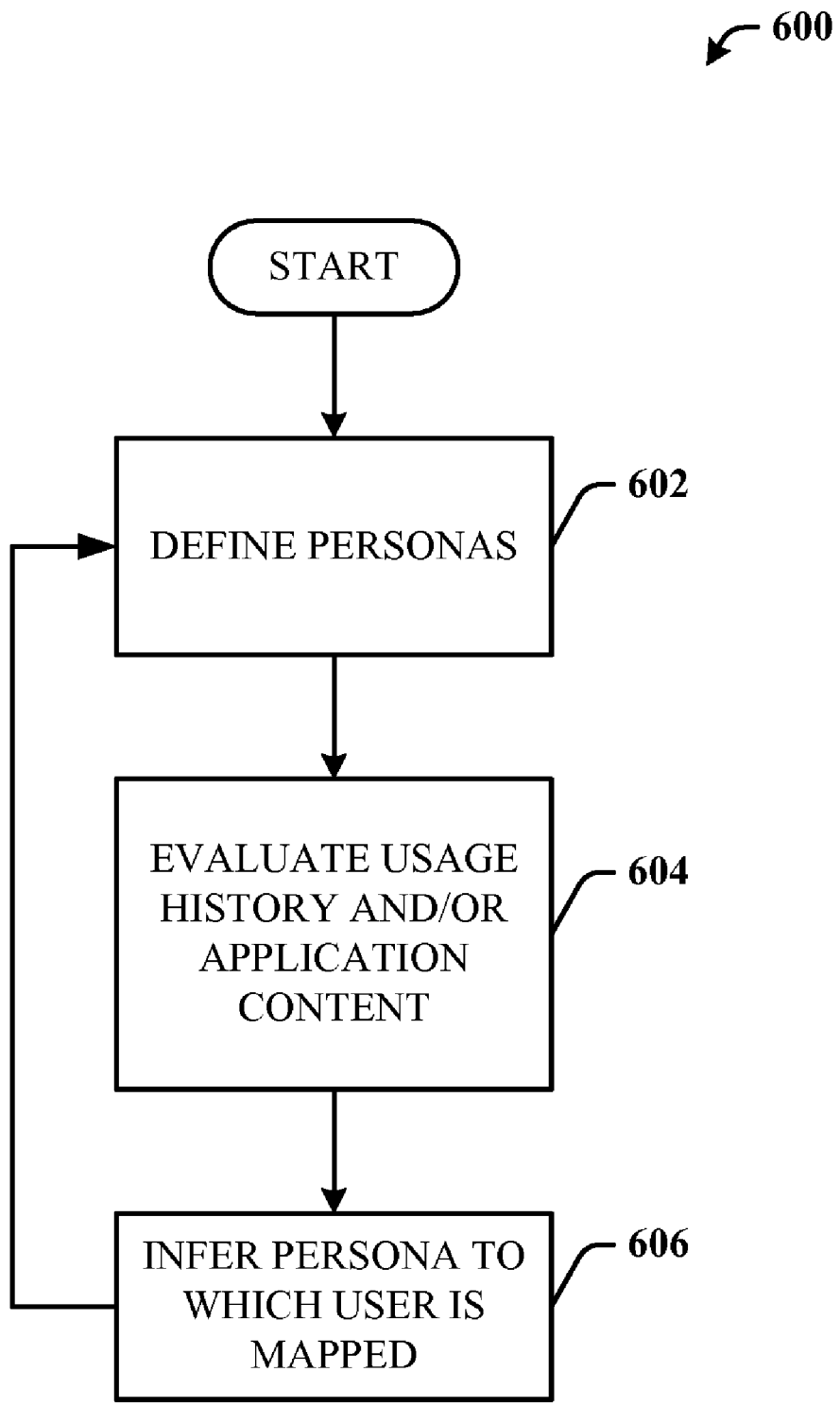
FIG. 6 illustrates a methodology for dynamically personalizing an application for a user based on personas, in accordance with various aspects described herein.

FIG. 6 illustrates a methodology 600 for dynamically personalizing an application for a user based on personas, in accordance with various aspects described herein. At 602, one or more personas can be dynamically defined based on usage history associated with a number of users. For example, for a web application, a number of personas may be defined for users visiting a web site. Such personas can comprise, for example, a developer persona (e.g., for software developers), a technician persona (e.g., for software technicians, IT personnel, . . . ), an end-user persona (e.g., for end-users of the software, . . . ), etc., without being limited thereto. The personas can be defined based on actions taken by all or a plurality of actions performed by visitors to the web site.

At 604, usage history and/or application content can be evaluated for all users and/or for a new user visiting the website. At 606, inferences can be made to facilitate mapping the new user to a persona in order to personalize the web site for the new user. For example, a new user who clicks on a link related to software patches can be inferred to be a technician looking for information to resolve a software problem, and can be mapped to the technician persona. The technician persona can be dynamically personalized to have patch information, software update information, new product information, etc., presented in a prominent spot on the web page for users mapped to the technician persona. According to another example, a new user who enters search terms and/or clicks on links related to information such as a "game title," "free demo," "expansion pack," etc., can be inferred at 606 to be an end-user at 606 and can be mapped to the end-user persona. An end-user persona can be utilized to personalize the web site to more prominently display information relevant to an end-user (e.g., new releases, game updates, . . . ). In this manner, by mapping a new user to a persona, the new user can receive personalized application content that can be frequently updated based on actions taken by all users mapped to the persona.

Figure 7:
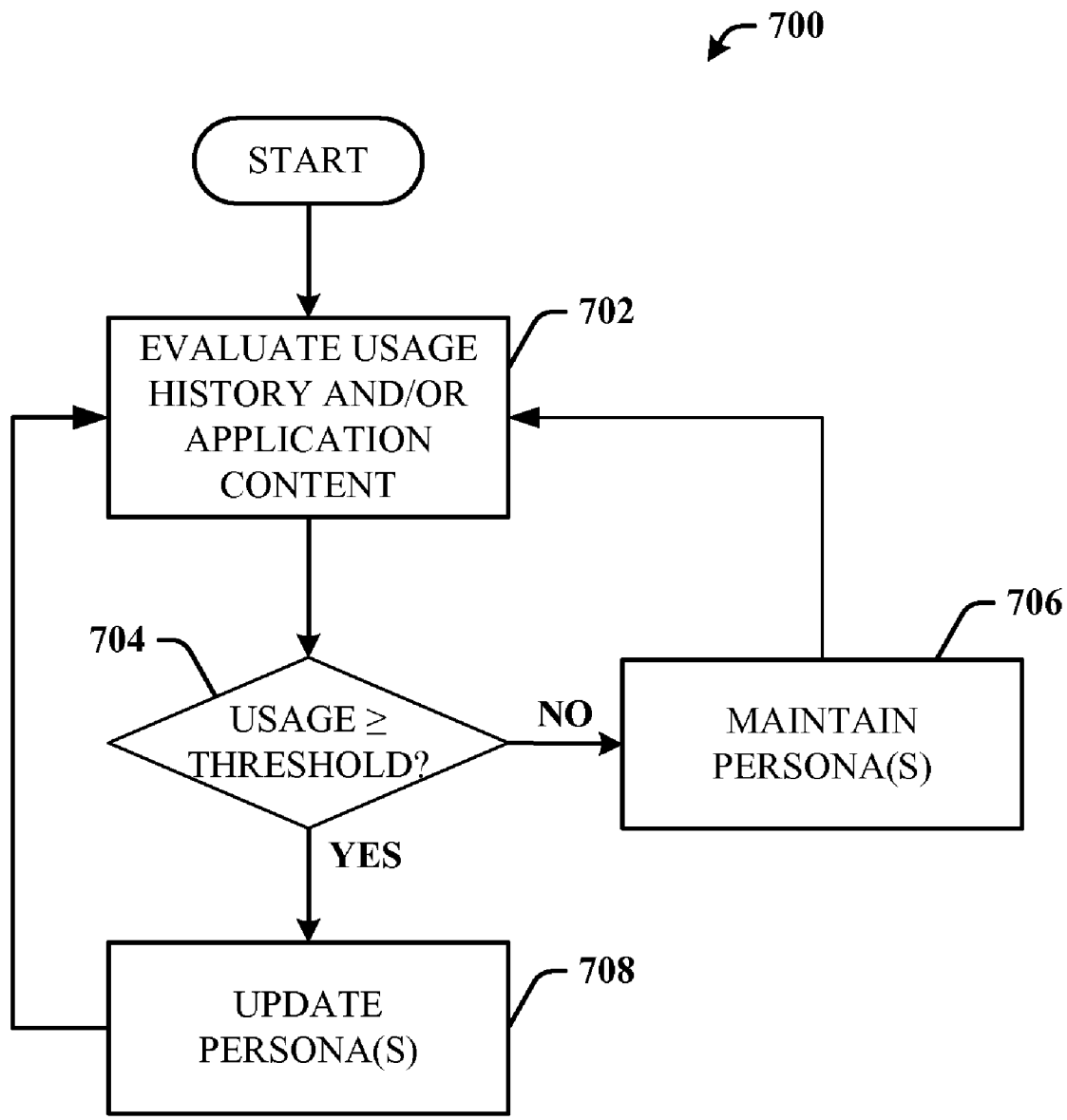
FIG. 7 illustrates a methodology for dynamically updating personas used to personalize applications of a user, in accordance with one or more aspects.

FIG. 7 illustrates a methodology 700 for dynamically updating personas used to personalize applications of a user, in accordance with one or more aspects. At 702, usage history and/or application content viewing history for a persona can be evaluated. For instance, the evaluation at 702 may indicate that 70% of users mapped to a gamer persona clicked on a link to information related to a particular game update during a predefined evaluation period (e.g., 30 minutes, 6 hours, 1 day, . . . ). At 704, comparison can be made to determine whether the content in question has been viewed, or "used," with a frequency that is at or above a threshold value to facilitate making an inference that the content should be made more available to users in the persona. For instance, if the usage level is below the threshold level, then at 706 a decision can be made to maintain the persona as-is and the method can revert to 702 for further iteration of usage and content evaluation. If, however, the usage level is greater than or equal to the threshold level, then at 708 the persona can be updated to facilitate presenting the evaluated content to a user at a more transparent level (e.g., reducing a number of clicks the user s has to make to access the content).

Figure 8:
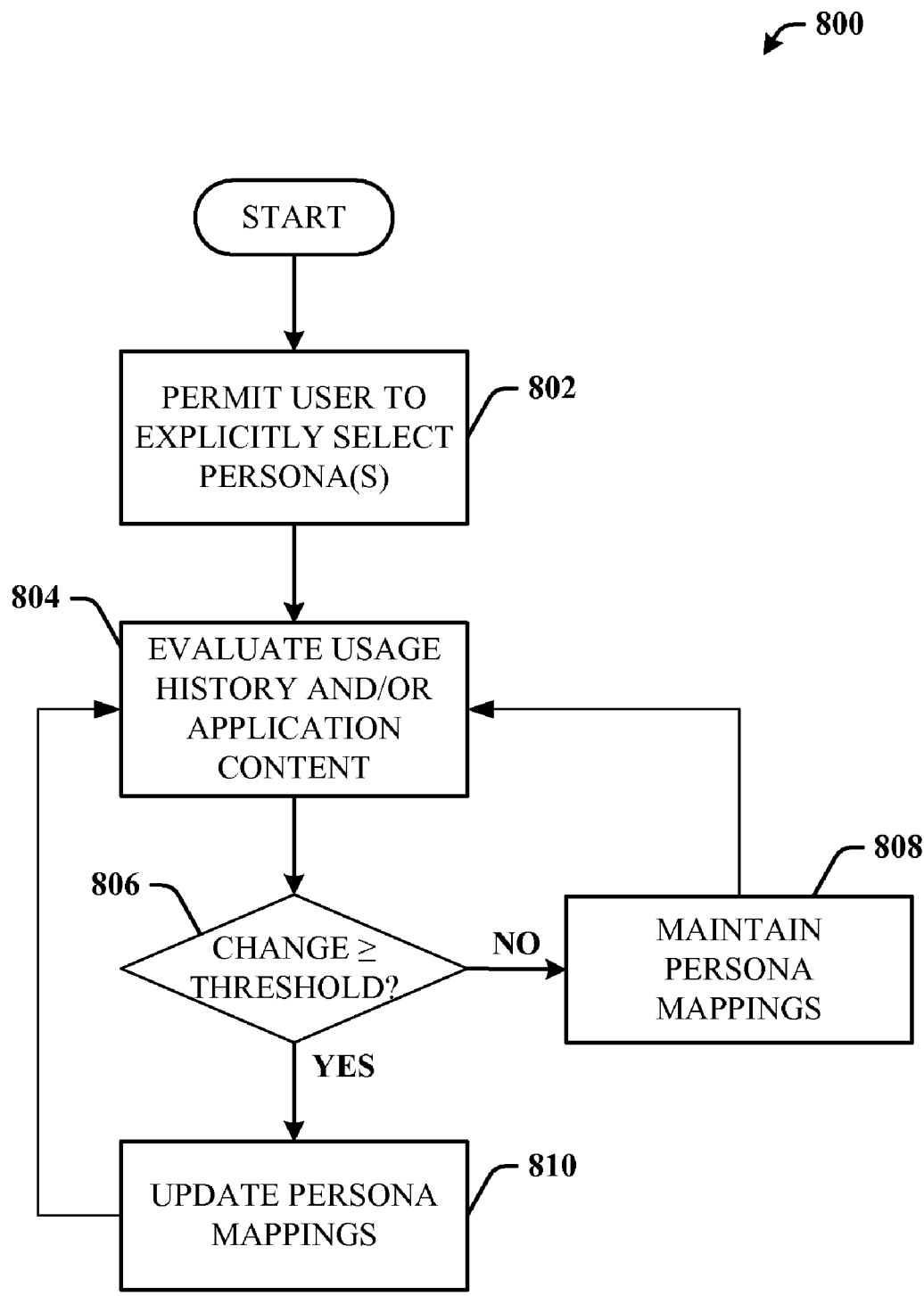
FIG. 8 is an illustration of a methodology for dynamically updating user-persona mappings, in accordance with various aspects.

FIG. 8 is an illustration of a methodology 800 for dynamically updating user-persona mappings, in accordance with various aspects. At 802, a user can be permitted to explicitly select a persona to which the user desires to be mapped. The selection at 802 can be utilized to override an automated mapping of the user to a persona inconsistent with the selected persona, and/or can be deemed a primary persona while permitting the user to be mapped to other personas as well. At 804, usage history and/or application/web site content viewed by the user can be evaluated to determine what content the user found relevant. At 806, a determination can be made regarding whether the usage history and/or viewed content over a predetermined evaluation period is consistent with the persona to which the user is mapped. If the change in usage is less than a predetermined threshold, then at 808 the persona(s) to which the user is presently mapped can be maintained and the method can revert to 804 for further evaluation. If the change in usage is equal to or greater than the threshold value, then the persona(s) to which the user is mapped can be updated at 810. For example, the user may have previously been mapped to a technician persona after entering searching terms such as "security patch," and/or "version update," in a previous session. However, in a scenario where the same user returns to the same web site and searches "Game X," "download," etc., the user can be inferred to have a higher correlation to a gamer persona, which can result in an update to the user's persona mapping at 810. It will be appreciated that the foregoing examples of search terms, threshold percentages, and the like are illustrative in nature and are not intended to limit the scope of the aspects described herein.

Figure 9:
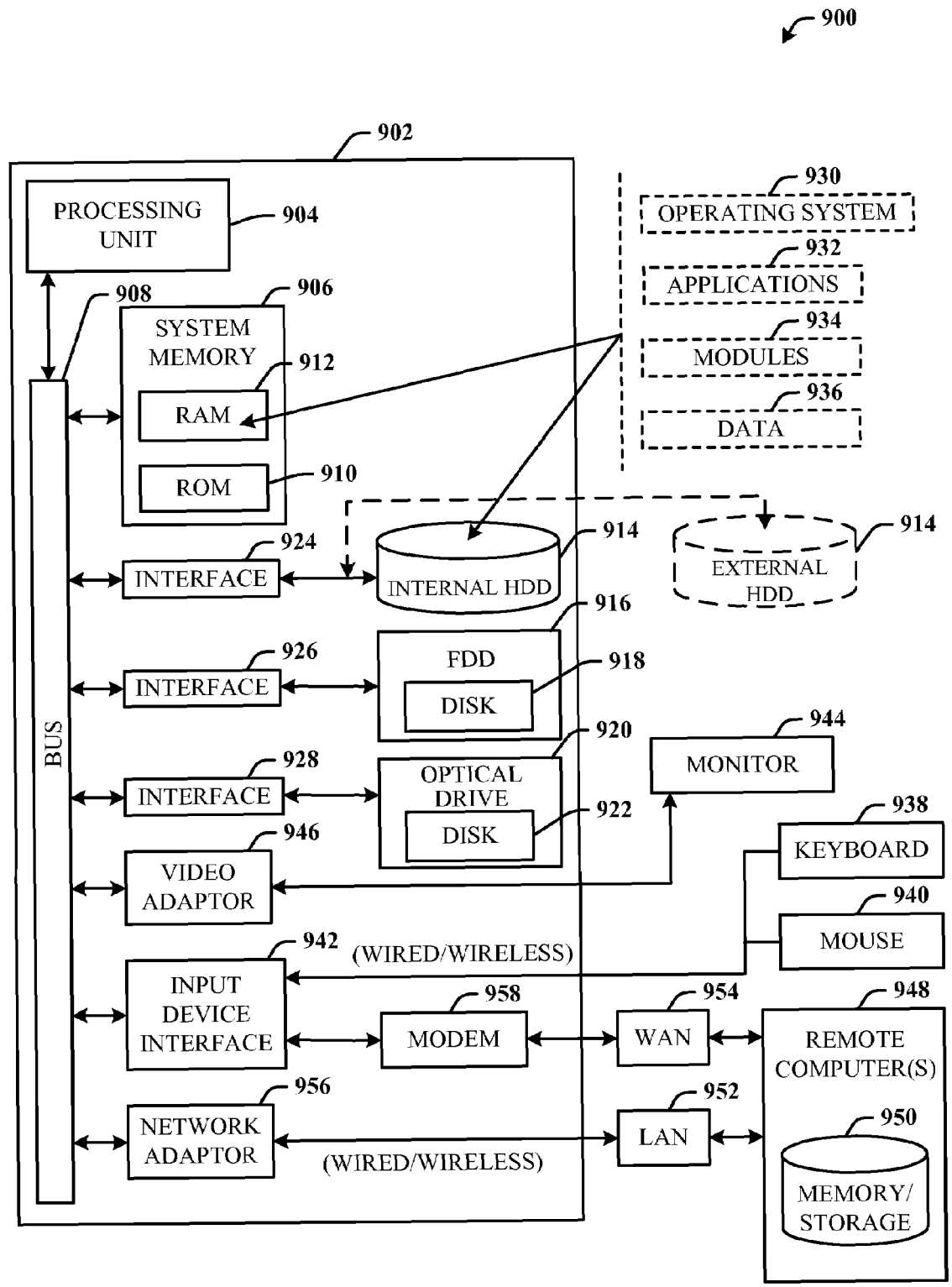
FIG. 9 illustrates a block diagram of a computer operable to execute the disclosed checkpointing architecture.

Referring now to FIG. 9, there is illustrated a block diagram of a computer operable to execute various aspects described herein. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g. a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g. a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band.

IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 10:
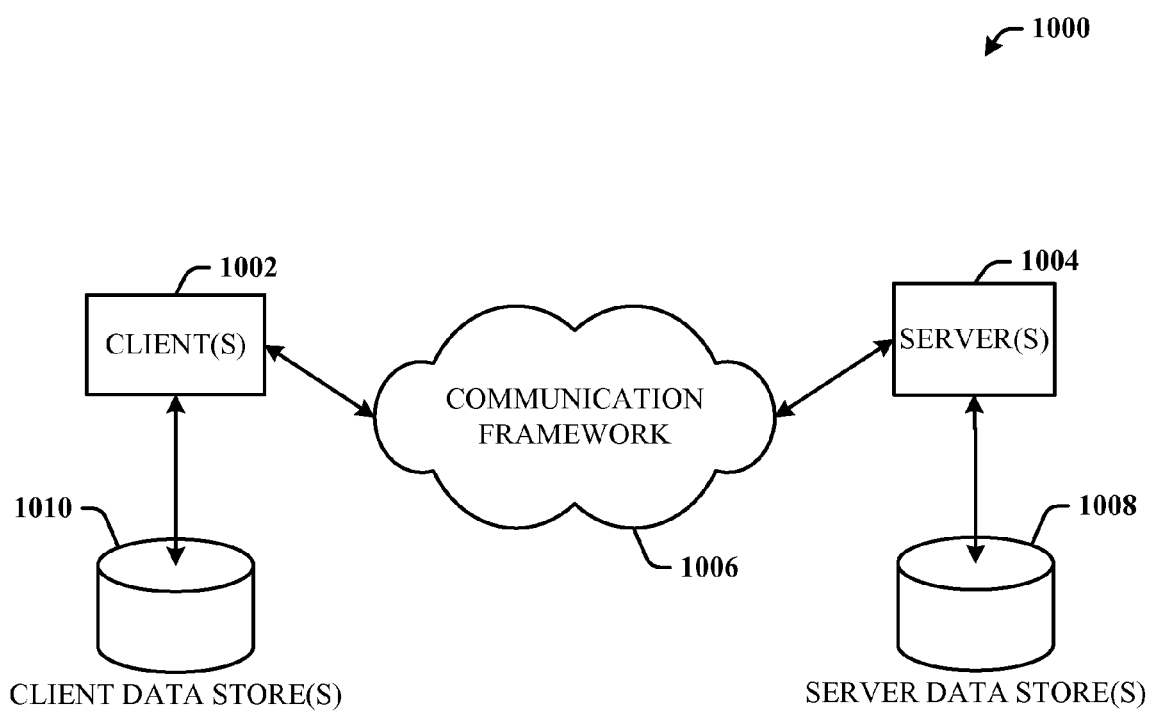
FIG. 10 illustrates a schematic block diagram of an exemplary two-tier client/server computing environment in accordance with various aspects.

Referring now to FIG. 10, there is illustrated a schematic block diagram of an exemplary two-tier client/server computing environment 1000 in accordance with various aspects. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1010 that can be employed to store information local to the client(s) 1002 (e.g., cookie(s) and/or associated contextual information). Similarly, the server(s) 1004 are operatively connected to one or more server data store(s) 1008 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates personalizing an application for a user, comprising:
   a processor that executes the following computer executable components stored on a computer-readable medium:
   a correlation component that evaluates historical application usage data associated with a plurality of users, the correlation component generates at least one persona based upon an identified similarity of the historical application usage for a subset of the plurality of users, the correlation component modifies the application for each persona to reduce the number of steps to perform one or more specific tasks within the application associated with the identified similarity of the historical application usage of the persona;
   a persona selection component that allows the user to select one or more of the at least one personas; and
   a business intelligence component that maps each of the plurality of users to one or more of the at least one persona as a function of the historical application usage data and the user selected persona(s); wherein,
   at least one persona has one or more sub-personas, wherein each sub-persona is associated with a distinct subset of application feature usage.

2. The system of claim 1, further comprising a content engine that stores and analyzes link information as a function of keywords associated with content related to a link for related content recommendation.

3. The system of claim 1, further comprising a user information engine that stores and analyzes information related to historical usage and application navigation by the plurality of users.

4. The system of claim 1, further comprising an analytics engine that determines patterns of user activity relative to content access by the plurality of users.

5. The system of claim 1, wherein the correlation component modifies the application by providing an application toolbar personalized for the persona with icons for performing the one or more specific tasks within the application associated with the identified correlation of the historical application usage of the persona.

6. The system of claim 1, further comprising a persona inference engine that infers one or more of the at least one persona to which a user is mapped as a function of the historical usage data associated with the user.

7. The system of claim 6, further comprising one or more servers that periodically refine the persona inference rules, and a client interface that enables a client device to download refined persona inference rules and unload one or more inferred current user personas, which are derived at least in part based on the user's most recent activity.

8. The system of claim 6, wherein the persona inference engine employs a URL-based inference rule and makes inferences based on substrings associated with URLs visited by the one or more users.

9. The system of claim 6, wherein the persona inference engine employs a keyword-based inference rule and makes inferences based on keywords associated with content viewed by the one or more users.

10. The system of claim 6, wherein the persona-based inference engine employs a search-based inference rule and makes inferences based on user-entered search terms.

11. A computer-implemented method of performing persona-based application personalization, comprising:
    employing a processor executing computer executable instructions stored on a computer readable storage medium to implement the following acts:
    evaluating usage history information associated with at least one user of an application;
    receiving a user selection of a persona; and inferring a persona from a plurality of defined personas to which to map the at least one user as a function of the usage history associated with the at least one user and the user persona selection, wherein a persona has a correlated history of application feature usage for a plurality of users of the application; wherein,
    at least one persona has one or more sub-personas, wherein each sub-persona is associated with a distinct subset of application feature usage.

12. The method of claim 11, wherein the user is automatically mapped to the persona if the user's historical application feature usage is above a threshold level of correlation to the historical application feature usage of the persona.

13. The method of claim 11, wherein the usage history comprises at least one of web content viewed by the at least one user, search terms entered by the at least one user, and URLs visited by the at least one user.

14. The method of claim 11, further comprising dynamically defining each of the plurality of personas as a function of application feature usage history associated with a plurality of users mapped to each persona.

15. The method of claim 14, further comprising updating each persona according to changes in usage history by the plurality of users mapped to each persona over a predefined evaluation period.

16. The method of claim 11, further comprising employing a URL-based inference rule and inferring a persona to which to map the at least one user based on substrings associated with URLs visited by the at least one user.

17. The method of claim 11, further comprising employing a keyword-based inference rule and inferring a persona to which to map the at least one user based on keywords associated with content viewed by the at least one user.

18. The method of claim 11, further comprising employing a search-based inference rule and inferring a persona to which to map the at least one user based on search terms entered by the at least one user.

19. A computer-executable system, comprising:
a processor;
a memory communicatively coupled to the processor, the memory having stored therein computer executable instructions configured to implement the system including:

computer implemented means for generating a plurality of personas, where each persona is based upon an identified correlation of historical usage of a plurality of users of an application;

computer implemented means for modifying the application for each persona to reduce the number of user actions to perform one or more specific tasks within the application associated with the identified correlation of the historical application usage of the persona; computer-implemented means for analyzing application usage history associated with a user;

computer-implemented means for receiving a user selection of a persona from the plurality of persona;

computer-implemented means for inferring a persona from the plurality of personas to which to map the user based at least in part on the application usage history and the user selection;

computer-implemented means for mapping the user to the persona, wherein each persona has a plurality of users mapped to the persona;

computer-implemented means for updating the persona as a function of the usage history of the plurality of users mapped to the persona; wherein, at least one persona has one or more sub-personas, wherein each sub-persona is associated with a distinct subset of application feature usage.

* * * * *

UNITED STATES PATENT AND TRADEMARK OFFICE
CERTIFICATE OF CORRECTION

| | |
|---|---|
| PATENT NO. | : 7,613,692 B2 |
| APPLICATION NO. | : 11/459780 |
| DATED | : November 3, 2009 |
| INVENTOR(S) | : Keith Hamilton et al. |

It is certified that error appears in the above-identified patent and that said Letters Patent is hereby corrected as shown below:

In column 18, line 2, in Claim 1, delete "personas;" and insert -- personas: --, therefor.

In column 18, line 35, in Claim 7, delete "unload" and insert -- upload --, therefor.

In column 19, line 20, in Claim 17, delete "keyword- based" and insert -- keyword-based --, therefor.

Signed and Sealed this
Fifteenth Day of February, 2011

David J. Kappos
*Director of the United States Patent and Trademark Office*